United States Patent
Wuidart

(10) Patent No.: US 8,922,341 B2
(45) Date of Patent: Dec. 30, 2014

(54) AUTHENTICATION OF A TERMINAL BY AN ELECTROMAGNETIC TRANSPONDER

(71) Applicant: STMicroelectronics (Rousset) SAS, Rousset (FR)

(72) Inventor: Luc Wuidart, Pourriéres (FR)

(73) Assignee: STMicroelectronics (Rousset) SAS, Roussel (FR)

( * ) Notice: Subject to any disclaimer, the term of this patent is extended or adjusted under 35 U.S.C. 154(b) by 0 days.

(21) Appl. No.: 13/900,442

(22) Filed: May 22, 2013

(65) Prior Publication Data

US 2013/0257587 A1 Oct. 3, 2013

Related U.S. Application Data

(63) Continuation of application No. 12/815,798, filed on Jun. 15, 2010, now Pat. No. 8,482,388.

(30) Foreign Application Priority Data

Jun. 25, 2009 (FR) ...................... 09 54345

(51) Int. Cl.
| | | |
|---|---|---|
| *G05B 19/00* | (2006.01) | |
| *G08B 23/00* | (2006.01) | |
| *G06F 7/00* | (2006.01) | |
| *G06F 7/04* | (2006.01) | |
| *G08B 29/00* | (2006.01) | |
| *G05B 1/01* | (2006.01) | |
| *G08B 21/02* | (2006.01) | |
| *G06K 19/07* | (2006.01) | |
| *G06K 19/073* | (2006.01) | |
| *G06K 7/10* | (2006.01) | |

(52) U.S. Cl.
CPC .............. *G05B 1/01* (2013.01); *G08B 21/0275* (2013.01); *G06K 19/0723* (2013.01); *G06K 19/07336* (2013.01); *G06K 7/10108* (2013.01)
USPC ........................ 340/5.8; 340/10.1; 324/260

(58) Field of Classification Search
CPC ........... G08B 13/2402; G08B 21/0275; G08B 13/2454; G06K 19/073; G06K 19/10
USPC ................. 340/10.1–10.6, 5.8; 324/260, 144, 324/754.27–754.29
See application file for complete search history.

(56) References Cited

U.S. PATENT DOCUMENTS

| | | |
|---|---|---|
| 5,442,342 A | 8/1995 | Kung |
| 5,703,573 A | 12/1997 | Fujimoto et al. |

(Continued)

FOREIGN PATENT DOCUMENTS

| | | |
|---|---|---|
| EP | 1071038 A1 | 1/2001 |
| FR | 2757952 A1 | 7/1998 |

OTHER PUBLICATIONS

French Search Report dated Feb. 2, 2010 from corresponding French Application No. 09/54345.

(Continued)

*Primary Examiner* — John A Tweel, Jr.
(74) *Attorney, Agent, or Firm* — Seed IP Law Group PLLC

(57) ABSTRACT

A method of authentication of a terminal generating a magnetic field by a transponder including an oscillating circuit from which a D.C. voltage is generated, wherein at least one quantity depending on the coupling between the transponder and the terminal is compared with at least one reference value.

34 Claims, 4 Drawing Sheets

(56) References Cited

U.S. PATENT DOCUMENTS

| | | | |
|---|---|---|---|
| 6,278,379 | B1 | 8/2001 | Allen et al. |
| 6,473,028 | B1 | 10/2002 | Luc |
| 6,650,229 | B1 | 11/2003 | Wuidart et al. |
| 6,703,921 | B1 | 3/2004 | Wuidart et al. |
| 6,950,008 | B2 | 9/2005 | Hagl et al. |
| 7,049,935 | B1 | 5/2006 | Wuidart et al. |
| 7,049,936 | B2 | 5/2006 | Wuidart et al. |
| 7,555,286 | B2 | 6/2009 | Sasakura et al. |
| 8,144,017 | B1 | 3/2012 | Leutgeb et al. |
| 8,446,259 | B2* | 5/2013 | Wuidart .................. 340/10.4 |
| 8,482,388 | B2* | 7/2013 | Wuidart .................. 340/10.4 |
| 2003/0071717 | A1 | 4/2003 | Hagl et al. |
| 2003/0102303 | A1 | 6/2003 | Clothier et al. |
| 2003/0164742 | A1* | 9/2003 | Wuidart ................. 331/117 R |
| 2005/0001609 | A1 | 1/2005 | Cuylen |
| 2005/0231328 | A1 | 10/2005 | Castle et al. |
| 2008/0055082 | A1* | 3/2008 | Savry et al. ............... 340/568.1 |
| 2008/0136643 | A1 | 6/2008 | Yeo et al. |
| 2008/0197983 | A1 | 8/2008 | Billmaier et al. |
| 2008/0204206 | A1 | 8/2008 | Frohler |
| 2009/0096580 | A1 | 4/2009 | Paananen |
| 2010/0052860 | A1* | 3/2010 | Sawada et al. ............... 340/10.1 |
| 2010/0073145 | A1 | 3/2010 | Lorenz et al. |

OTHER PUBLICATIONS

French Search Report dated Feb. 9, 2010 from potentially related French Application No. 09/54147.

French Search Report dated Feb. 3, 2010 from potentially related French Application No. 09/54347.

French Search Report dated Feb. 9, 2010 from potentially related French Application No. 09/54148.

French Search Report dated Feb. 8, 2010 from potentially related French Application No. 09/54149.

French Search Report dated Feb. 17, 2010 from potentially related French Application No. 09/54351.

* cited by examiner

_US 8,922,341 B2_

AUTHENTICATION OF A TERMINAL BY AN ELECTROMAGNETIC TRANSPONDER

CROSS REFERENCE TO RELATED APPLICATIONS

This application is a Continuation of U.S. patent application Ser. No. 12/815,798, filed on Jun. 15, 2010, which claims the priority benefit of French patent application number 09/54345, filed on Jun. 25, 2009, which applications are hereby incorporated by reference to the maximum extent allowable by law.

BACKGROUND OF THE INVENTION

1. Field of the Invention

The present invention generally relates to electronic systems, and more specifically to systems using electromagnetic transponders, that is, transceivers capable of being interrogated in a contactless and wireless manner by a read and/or write terminal.

2. Discussion of the Related Art

Many communication systems are based on a modulation of an electromagnetic field generated by a terminal. They range from the simplest electronic tag used as a theft-prevention device to more complex systems where a transponder intended to communicate with the terminal when it is in its field, is equipped with calculation functions (electronic purse, for example) or data processing functions.

Electromagnetic transponder systems are based on the use of oscillating circuits comprising a winding forming an antenna, on the transponder side and on the terminal side. Such circuits are intended to be coupled by a near magnetic field when the transponder enters the field of the terminal. The oscillating circuits of the terminal and of the transponder are generally tuned to the same frequency corresponding to the excitation frequency of the oscillating circuit of the terminal.

In most cases, transponders have no autonomous power supply and extract the power supply necessary to their circuits from the high-frequency field radiated by the antenna of the terminal.

When a transponder needs to communicate with a terminal, the transponder may have to authenticate the terminal before accepting a data exchange. For example, in applications where the transponder is used as a payment means (be it in money or units of account), it may reserve payments to certain terminals. According to another example, a transponder of chip card type, associated with electronic equipment (for example, a personal digital assistant or a cell phone) identifies or authenticates a user in a communication with other electronic equipment (for example, a laptop or desktop computer).

Currently, authentication processes use cryptography algorithms and a data exchange between the terminal and the transponder. Such processes require significant power- and time-intensive calculations. Further, any cryptographic process is more or less sensitive to attacks aiming at discovering the secret of the authentication to hack the system.

SUMMARY OF THE INVENTION

It would be desirable for a transponder to be able to authenticate a terminal with which it needs to communicate before it has to transmit data to the terminal.

It would also be desirable to have an authentication process independent from any cryptography.

It would also be desirable to have a fast, less power- and calculation-intensive authentication process.

It would also be desirable to authenticate the terminal without having to perform, on each authentication, a data exchange between the terminal and the transponder.

To achieve all or part of these objects as well as others, at least one embodiment of the present invention provides a method of authentication of a terminal generating a magnetic field, by a transponder comprising an oscillating circuit from which a D.C. voltage is generated, wherein at least one quantity depending on the coupling between the transponder and the terminal is compared with at least one reference value.

According to an embodiment of the present invention, a quantity corresponding to the level of said D.C. voltage is measured and compared with a reference value depending on this same voltage in a condition of optimum coupling between the transponder and the terminal.

According to an embodiment of the present invention, said value in the optimum coupling condition is deduced from a training phase.

According to an embodiment of the present invention:

a first quantity corresponding to the level of said D.C. voltage is measured and stored for a first value of the resistive load formed by circuits of the transponder on the oscillating circuit;

a second quantity corresponding to the level of said D.C. voltage is measured and stored for a second value of the resistive load on the oscillating circuit; and a ratio between the two quantities is compared with one or several reference values.

According to an embodiment of the present invention, said reference value depends on the respective resistive load values.

According to an embodiment of the present invention, a variation of the resistive load between the first and second values is obtained by modifying the consumption of processing circuits comprised by the transponder.

According to an embodiment of the present invention, a variation of the resistive load between the first and second values is obtained by switching a resistive retromodulation element comprised by the transponder.

According to an embodiment of the present invention, in the absence of an authentication, the transponder sends intentionally incorrect data.

The present invention also provides an electromagnetic transponder comprising:

an oscillating circuit upstream of a rectifying circuit capable of providing a D.C. voltage when the transponder is present in the magnetic field of a terminal; and at least one processing unit capable of implementing the authentication method.

The foregoing objects, features, and advantages of the present invention will be discussed in detail in the following non-limiting description of specific embodiments in connection with the accompanying drawings.

DETAILED DESCRIPTION

Figure 1:
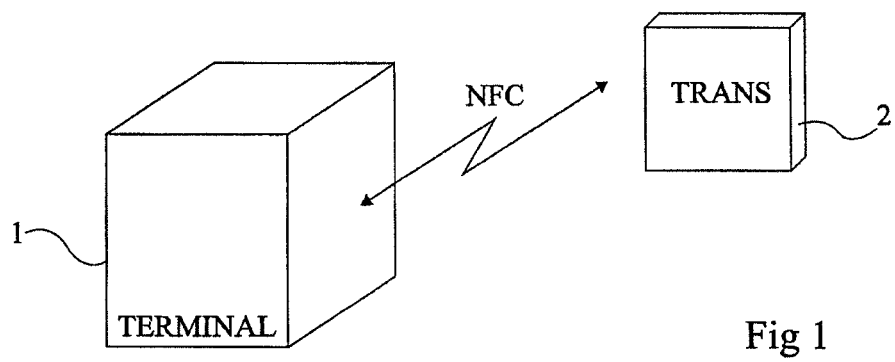
FIG. 1 is a very simplified representation of a transponder system of the type to which the present invention applies as an example.

The same elements have been designated with the same reference numerals in the different drawings. For clarity, only those steps and elements which are useful to the understanding of the present invention have been shown and will be described. In particular, the communications between the transponder and the terminal have not been detailed, the present invention being compatible with any usual communication. Further, the functions capable of being implemented by a terminal or by a transponder, other than the authentication by this transponder, have not been detailed either, the present invention being here again compatible with any usual function of a terminal or of a transponder.

FIG. 1 is a block diagram of an electromagnetic transponder communication system. A terminal 1 (TERMINAL) is capable of communicating in near field (for example according to a near field communication protocol NFC) with a distant element, that is, a transponder (TRANS).

The terminal may take different forms, for example, a transport ticket validation terminal, an electronic passport reader, a laptop computer, a mobile telecommunication device (GSM phone, PDA, etc.), an electronic control unit for starting an automobile vehicle, etc.

The transponder may similarly take different forms, for example, a chip card, an electronic transport ticket, an electronic passport, a telecommunication terminal (GSM phone, PDA, etc.), an electronic tag, etc.

Figure 2:
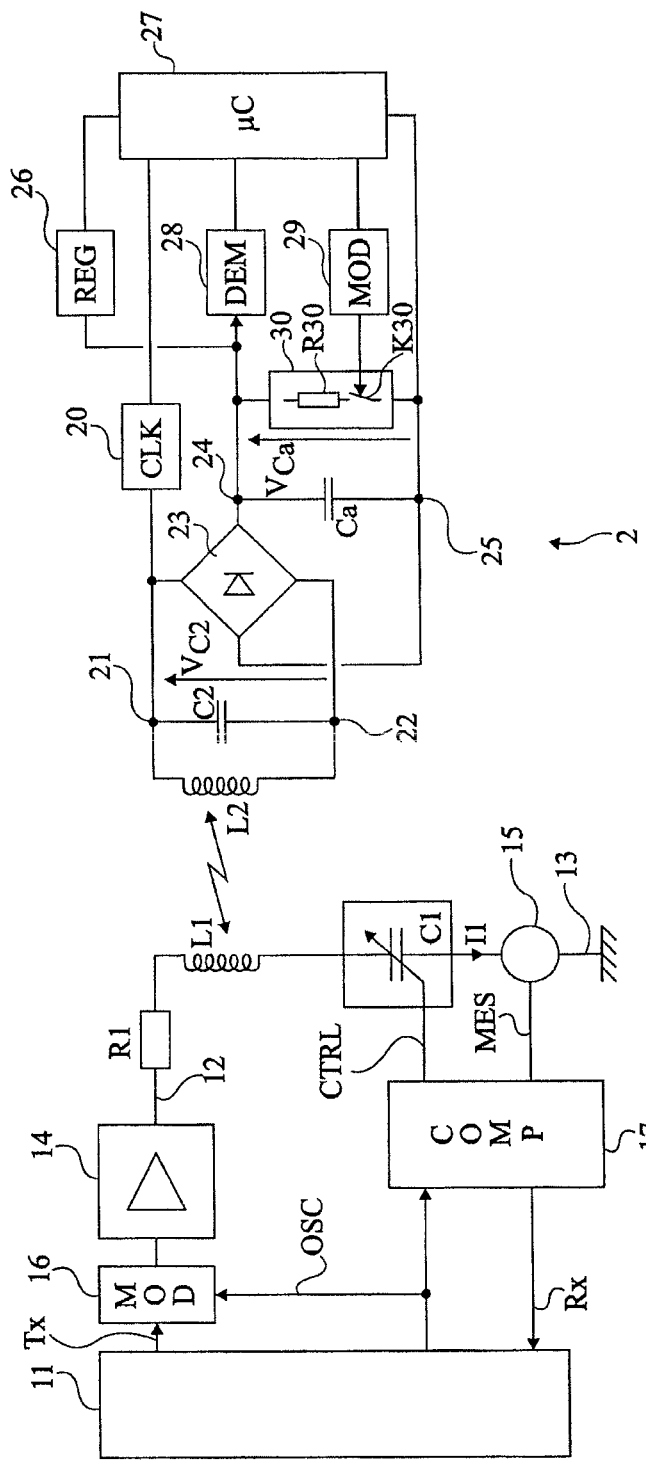
FIG. 2 is a simplified block diagram of a terminal and of a transponder of an electromagnetic transponder communication system.

FIG. 2 very schematically shows a simplified example of a terminal 1 and of a transponder 2.

Terminal 1 comprises an oscillating circuit, generally series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, not shown. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1, which generates a magnetic field.

Capacitive element C1 is, for example, a variable-capacitance element controllable by a signal CTRL. This element takes part in the phase regulation of current T1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal for example corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES about current I1 in the oscillating circuit detected by measurement element 15 (for example, a current transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called receive mode resonant circuit) is intended to capture the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller C) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in a same chip.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{Ca}$. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. One can speak of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

Regulating the phase on the terminal side enables using current and voltage measurements in the oscillating circuit of the transponder to deduce from these measurements information relative to the transponder coupling when it is in the field of the terminal. The coupling coefficient between the oscillating circuit of the terminal and of the transponder essentially depends on the distance separating the transponder from the terminal. The coupling coefficient, noted k, is always between 0 and 1. It can be defined by the following formula:

$$k = \frac{M}{\sqrt{L1 \cdot L2}}, \quad \text{(formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is maximum. This optimum coupling, noted $k_{opt}$, may be expressed as:

$$k_{opt} = \sqrt{\frac{L2}{L1} \cdot \frac{R1}{R2}}, \quad \text{(formula 2)}$$

where R2 represents the resistance equivalent to the load formed by the elements of the transponder on its own oscillating circuit. In other words, resistance R2 represents the equivalent resistance of all the circuits of transponder 2, placed in parallel on capacitor C2 and inductance L2 (before or after the rectifying bridge). The conductance due to the transponder circuits will be called "resistive load". The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Formula 2 represents a signature of the terminal-transponder couple. For a same transponder and given operating conditions (load R2), the optimum coupling coefficient varies according to the terminal which conditions values L1 and R1.

It is provided to take advantage of this feature to enable a transponder to authenticate the terminal in the range of which it is located by indirectly verifying this signature.

Figure 3:
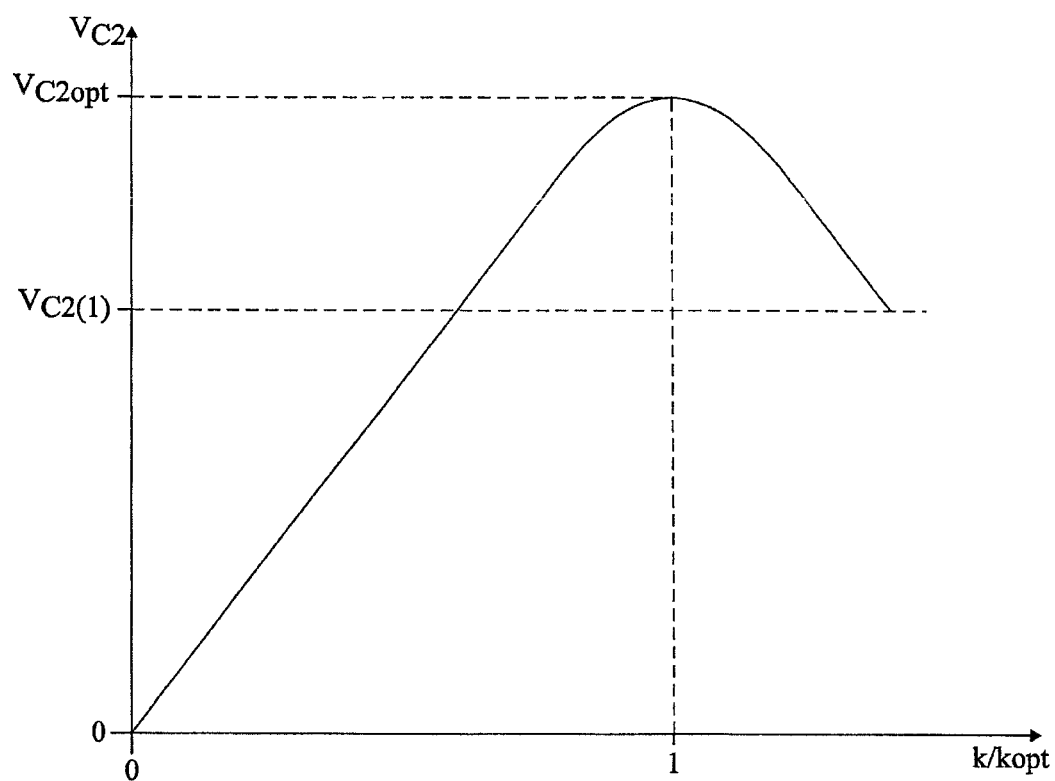
FIG. 3 illustrates an example of the variation of the voltage across the oscillating circuit of the transponder according to the coupling factor.

FIG. 3 shows an example of the variation of voltage $V_{C2}$ recovered on the transponder side according to the coupling $k/k_{opt}$ normalized with respect to the optimum coupling. The curve starts from the origin of ordinates (zero voltage) for a zero coupling. This corresponds to a distance from the transponder to the terminal such that no signal is sensed by the transponder. Voltage $V_{C2}$ reaches a maximum value $V_{C2opt}$ for optimum coupling coefficient $k_{opt}$ ($k/k_{opt}=1$), then decreases to an intermediary value $V_{C2}(1)$ reached at coupling $k=1$.

To evaluate, on the transponder side, the coupling of this transponder with the terminal, the information of voltage $V_{C2}$ across capacitive element C2 of its oscillating circuit is exploited. This voltage is provided by the following relation:

$$V_{C2} = \frac{I2}{\omega \cdot C_2}, \quad \text{(formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \quad \text{(formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \quad \text{(formula 5)}$$

where X2 represents the imaginary part of the impedance of the oscillating circuit $$\left(X2 = \omega \cdot L2 - \frac{1}{\omega \cdot C2}\right).$$

Further, current I1 in the oscillating circuit of the terminal is given by the following relation:

$$I1 = \frac{Vg}{Z1_{app}}, \quad \text{(formula 6)}$$

where Vg designates a so-called generator voltage, exciting the oscillating circuit of the terminal, and where $Z1_{app}$ represents the apparent impedance of the oscillating circuit.

The fact of regulating the phase of the oscillating circuit of the terminal enables for all the variations which would tend to modify, statically with respect to the modulation frequencies, the imaginary part of the load formed by the transponder, to be compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \quad \text{(formula 7)}$$

Since the oscillating circuits are tuned, it can be considered that imaginary part X2 of impedance Z2 is, as a first approximation, close to zero. As a result, the value of impedance Z2 can be written as:

$$Z2 = \frac{L2}{R2 \cdot C2}. \quad \text{(formula 8)}$$

By inserting this simplification into formulas 4 and 7, and inserting formula 4 into formula 3, the following formula can be obtained for voltage $V_{C2}$ recovered across the oscillating circuit of the transponder:

$$V_{C2} = k \cdot \sqrt{\frac{L1}{L2}} \cdot \frac{V_g}{\frac{R1}{R2} + k^2 \cdot \frac{L1}{L2}}. \quad \text{(formula 9)}$$

Formula 9 shows that, for a given terminal (fixed values of Vg, R1, and L1) and for a fixed impedance L2 (and thus a fixed value of C2), voltage $V_{C2}$ only depends on coupling k and on the resistive load (equivalent to resistor R2) formed by the transponder circuits and brought in parallel on the oscillating circuit.

It should be noted that formula 9 can only be applied when the oscillating circuit of transponder L2-C2 is considered to be set to the tuning frequency, that is, $\omega\sqrt{L2 \cdot C2}=1$.

In optimum coupling position $k_{opt}$, maximum voltage $V_{C2opt}$ is thus provided by the following formula (combining formulas 2 and 9):

$$V_{C2opt} = \frac{V_g}{2} \cdot \sqrt{\frac{R2}{R1}} \quad \text{(formula 10)}$$

Formula 10 shows that, for a given terminal, it is possible to store, in a training phase where the transponder is in relation with the terminal, value $V_{C2opt]R20}$ associated with the transponder-terminal couple with load R20. To achieve this, it is enough to know values Vg and R1 and to measure voltage $V_{C2}$.

After, in operation, an authenticity test may be performed by comparing the current value of voltage $V_{C2]R20}$, with a value R20 of resistor R2 to value $V_{C2opt]R20}$. The current value should be smaller than or equal to the stored value. If not, this means that the terminal is set to generate a field greater than the provided field. The terminal is then considered as inauthentic (or improperly configured). There is indeed a risk for it to be a pirate terminal.

By combining formulas 9 and 10 and by expressing the coupling as normalized by the optimum coupling ($k/k_{opt}$), the following expression of voltage $V_{C2}$ is obtained:

$$V_{C2} = 2 \cdot V_{C2opt} \cdot \frac{\frac{k}{k_{opt}}}{1 + \left(\frac{k}{k_{opt}}\right)^2}. \quad \text{(formula 11)}$$

For a given coupling value k, considering that the impedance of the oscillating circuit of the terminal does not vary and that the circuits remain tuned, the ratio between values $V_{C2]R21}$ and $V_{C2]R20}$ of voltage $V_{C2}$, respectively for values R21 and R20 of resistor R2, provides, according to formula 11, the following relation:

$$\frac{V_{C2]R21}}{V_{C2]R20}} = \frac{\left(\frac{k}{k_{opt]R20}}\right)^2 + 1}{\left(\frac{k}{k_{opt]R20}}\right)^2 + \frac{R20}{R21}}. \quad \text{(formula 12)}$$

Formula 12 shows that by increasing the value of resistor R2 from a first value R20 to a second greater value R21 (which amounts to decreasing the load of the transponder circuits on oscillating circuit L2-C2), voltage $V_{C2]R21}$ will be greater than voltage $V_{C2]R20}$. Conversely, a decrease in the value of transistor R2 causes a decrease in recovered voltage $V_{C2}$.

Accordingly, for a given terminal (fixed values of Vg and R1) and a tuned system, the voltages obtained with two resistive loads (equivalent to resistors R20 and R21) can be compared. If, when value R20 of resistor R2 is increased (by decreasing the resistive load) up to a value R21, the obtained voltage $V_{C2]R21}$ is not greater than initial voltage $V_{C2]R20}$, this means that the terminal is provided to generate a current Vg/R1 smaller than the expected current, and thus that the terminal-transponder couple does not respect the expected signature.

For a resistive load variation corresponding to switching from an equivalent resistance R2 of value R20 to a greater value R21, formula 12 provides:

$$\left(\frac{k}{k_{opt]R20}}\right)^2 = \frac{1 - \frac{V_{C2]R21}}{V_{C2]R20}} \cdot \frac{R20}{R21}}{\frac{V_{C2]R21}}{C_{C2]R20}} - 1}. \quad \text{(formula 13)}$$

The combination of formulas 11 and 13 provides:

$$\frac{V_{C2]R20}}{V_{C2opt]R20}} = \frac{2 \cdot \sqrt{\left(\frac{V_{C2]R20}}{V_{C2]R21}} - \frac{R20}{R21}\right) \cdot \left(1 - \frac{V_{C2]R20}}{V_{C2]R21}}\right)}}{1 - \frac{R20}{R21}}. \quad \text{(formula 14)}$$

For a variation of the value of resistance R2 from a value R20 to a smaller value R21, formulas 13 and 14 respectively become:

$$\left(\frac{k}{k_{opt]R20}}\right)^2 = \frac{\frac{V_{C2]R21}}{V_{C2]R20}} \cdot \frac{R20}{R21} - 1}{1 - \frac{V_{C2]R21}}{V_{C2]R20}}}, \quad \text{(formula 13')}$$

and $$\frac{V_{C2]R20}}{V_{C2opt]R20}} = \frac{2 \cdot \sqrt{\left(\frac{R20}{R21} - \frac{V_{C2]R20}}{V_{C2]R21}}\right) \cdot \left(\frac{V_{C2]R20}}{V_{C2]R21}} - 1\right)}}{\frac{R20}{R21} - 1}. \quad \text{(formula 14')}$$

Thus, the value of current value $V_{C2]R20}$ with voltage can also be verified. According to the direction of the variation of resistance R2, If this voltage does not respect one of above relations 14 and 14', this means that the terminal does not need to be considered as belonging to the provided terminal-transponder couple.

In practice, rather than a direct measurement of the voltage across the oscillating circuit, a measurement the smoothed voltage across capacitor $V_{Ca}$ at the output of rectifying bridge 23 is performed. Voltage $V_{Ca}$ is proportional to voltage $V_{C2}$. Since voltage ratios are being evaluated, it is not necessary to know the proportionality factor between voltages $V_{C2}$ and $V_{Ca}$. In a specific embodiment, the measurement is performed by the microprocessor. The storage of the values of the measured voltages is performed either by analog means or, preferentially, digitally over several bits, the number of which depends on the desired accuracy of analysis.

Figure 4:
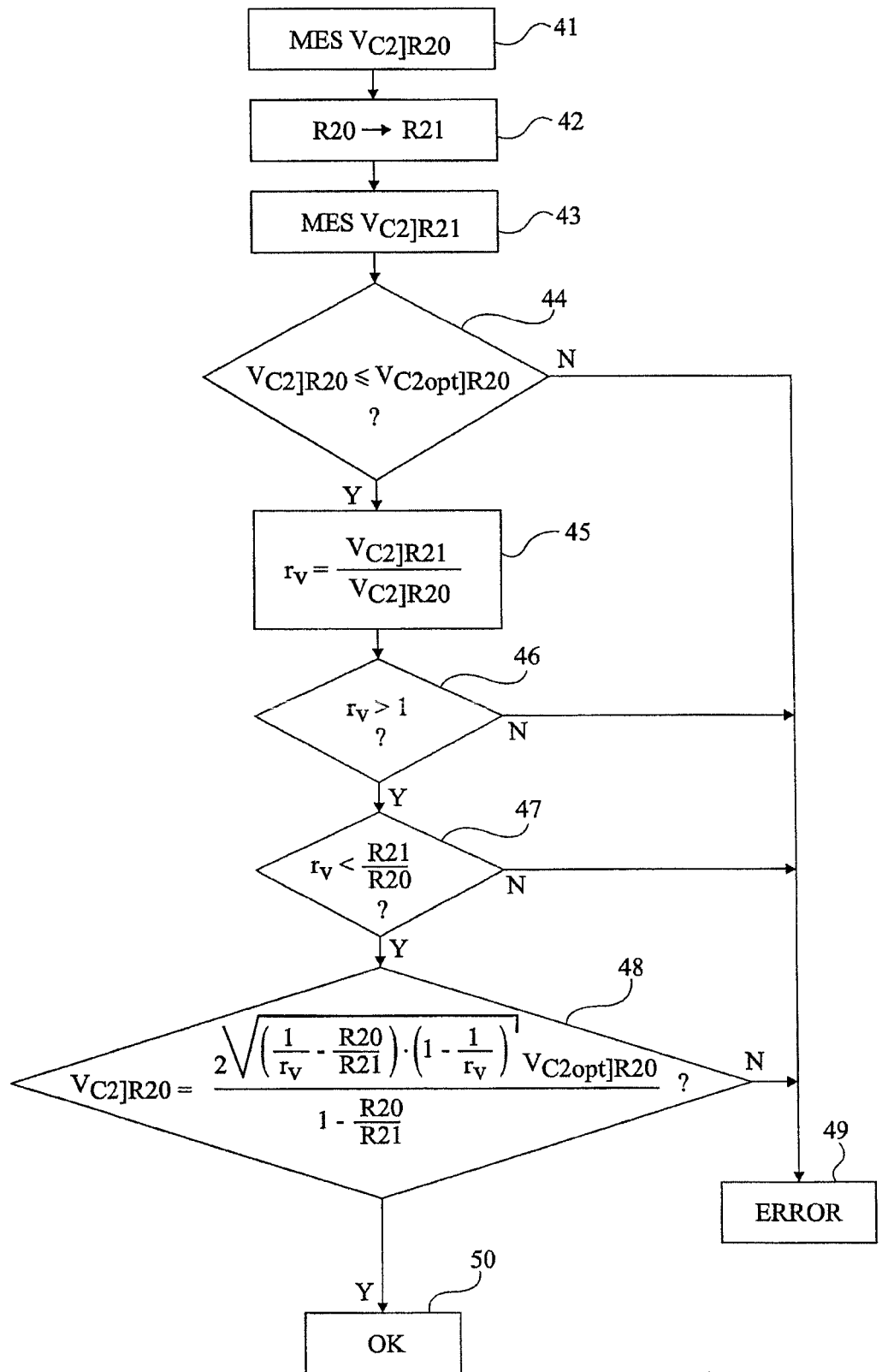
FIG. 4 is a functional block diagram illustrating an embodiment of the method of terminal authentication by a transponder.

FIG. 4 illustrates the implementation of an embodiment of the method for verifying the authenticity of a terminal having the transponder in its field. To simplify the discussion of FIG. 4, it is still referred to values $V_{C2]R20}$ and $V_{C2]R21}$, knowing that it is in practice easier to measure values $V_{Ca]R20}$ and $V_{Ca]R21}$ of voltage $V_{Ca}$ but that this changes nothing to the comparison values.

It is started (block 41, MES $V_{C2]R20}$) by measuring and storing the voltage across capacitor C2 with a first value R20 of resistor R2. Then, (block 42, R20→R21), the value of the resistive element is modified towards a greater value.

Then (block 43, $V_{C2]R21}$), voltage $V_{C2}$ is measured with resistance value R21, which is stored.

The current value $V_{C2]R20}$ obtained with value R20 is compared (block 44, $V_{C2]R20} \leq V_{C2opt]R20}$) with value $V_{C2opt]R20}$ at optimum coupling $k_{opt}$. It should be reminded that this value at the optimum coupling is known by the transponder and has been stored therein during a training phase where the transponder was considered as being in the field of an authentic reader. Test 44 may be performed as soon as voltage $V_{C2]R20}$ has been measured (after step 41).

If test 44 is not satisfied (output N of block 44), unit 27 of the transponder for example causes an error processing (block 49, ERROR). This processing for example corresponds to a transaction denial, to a transponder reset, to a fail-soft operation (without performing the functions which are critical as to the manipulated information), etc. It may also be provided for the transponder to send messages to mislead or confuse the terminal with intentionally incorrect information, for example, messages comprising random data. Various other processings may be envisaged, for example, any error processing usually provided in the absence of an authentication by a ciphering mechanism.

If test 44 is successfully passed (output Y of block 44), it is provided, in the embodiment of FIG. 4, to perform two successive tests on the value of the ratio between voltages $V_{C2]R20}$ and $V_{C2]R21}$.

For this purpose, a ratio $r_v$ between the voltages measured with the resistive loads equivalent to values R20 and R21 of resistor R2 is calculated and stored $$\left(\text{block 45}, r_v = \frac{V_{C2]R21}}{V_{C2]R20}}\right).$$

Then (block 46, $r_v > 1$), it is verified whether this ratio is greater than 1. If not (output N of block 46), it is proceeded to error processing 49.

Otherwise, it is verified (block 47, $r_v < R21/R20$) whether this ratio is smaller than the ratio between values R21 and R20. Indeed, if not (output N of block 47), this means that the terminal generates a field greater than the expected field. The terminal is thus not authorized (block 49).

Finally, a last test is then performed on the value of voltage $V_{C2]R20}$, which amounts to verifying $$\left(\text{block 48}, V_{C2]R20} = \frac{2 \cdot \sqrt{\left(\frac{1}{r_v} - \frac{R20}{R21}\right) \cdot \left(1 - \frac{1}{r_v}\right)} \cdot V_{C2opt]R20}}{1 - \frac{R20}{R21}}?\right)$$

whether formula 14 is respected. If such is not the case (output N of block 48), the error processing is applied. If, conversely, all tests are validated (output Y of block 48), it can be considered that the terminal having the transponder in its field is authentic (block 50, OK) and the transaction or communication can start.

The tests may be performed in a different order than that indicated hereabove. However, they are preferentially performed in an order of increasing calculation complexity, which enables to more rapidly reject a terminal which is not adapted to the transponder.

Further, different intermediary values (for example, ratio $r_v$ or ratio R21/R20) may be stored to be reused in the successive tests or, conversely, calculated on the fly.

Further, the number of performed tests depends on the application, on the reliability of the desired authentication, on the calculating power of the transponder, on the available data, etc. For example, in a simplified embodiment where the values of resistors R20 and R21 are not determinable but where it is only known that value R21 is greater than value R20, test 46 will be sufficient. It should be noted that, in this simplified embodiment, no training is necessary. The verification may however be improved by performing several verifications with more than two values of resistor R2. The evaluation may also be performed by decreasing the value of resistor R2. It will then be ascertained that this value is sufficient to preserve a sufficient value $V_{C2]R21}$ of voltage $V_{C2}$ to ensure a power supply of the transponder circuits. Further, the relations of tests 43 and 47 must then be inverted ($r_v < 1$ and $r_v > R21/R20$).

Tolerances or ranges of acceptable values may be introduced into the tests to take into account possible operating drifts of the terminal or, in the case of a family of authorized terminals, possible acceptable dispersions among the terminals of this family.

It is thus possible, based on two voltage measurements with two resistance values of the oscillating circuit of the transponder, to perform an authentication of the terminal.

The reliability of this authentication may be improved by exploiting relations determined by training.

Figure 5:
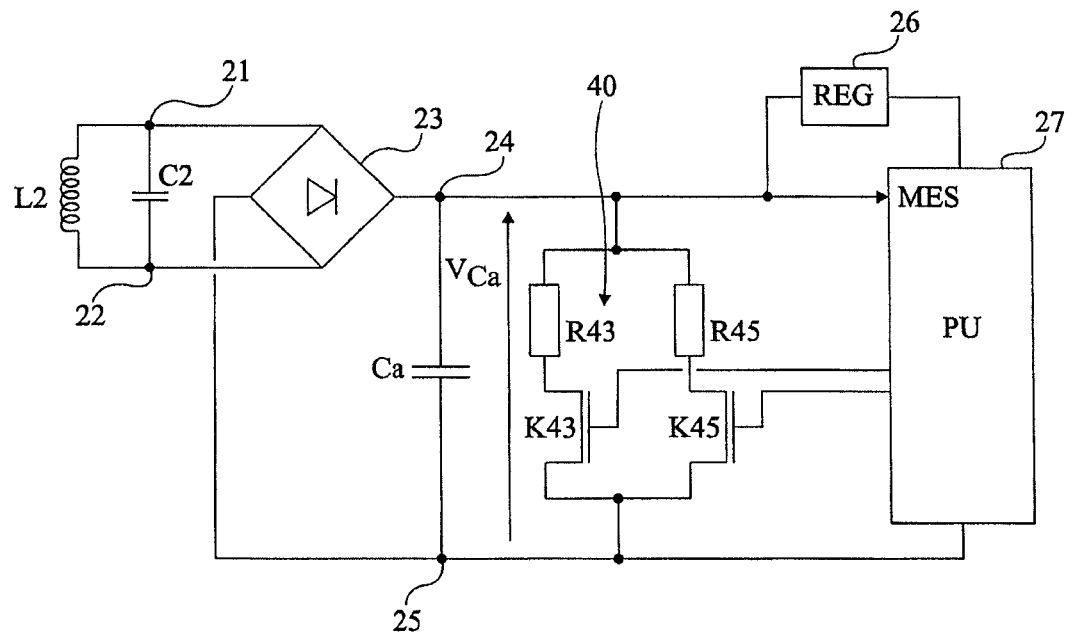
FIG. 5 is a functional block diagram illustrating an embodiment of a training phase.

FIG. 5 is a block diagram of an embodiment of a transponder 2, equipped to automatically determine, when it is in the field of a terminal (not shown), whether this terminal is authorized. The representation of FIG. 5 is simplified with respect to that of FIG. 2. In particular, the means of demodulation, retromodulation, and for obtaining the clock frequency have not been illustrated.

As previously, transponder 2 is based on a parallel oscillating circuit L2-C2 having its terminals 21 and 22 connected to the input terminals of a rectifying bridge 23. An element for measuring the current Ic intended for the processing unit may be provided at the output of regulator 26. Further, a switchable resistive circuit 40 is provided between terminals 24 and 25 of rectifying bridge 23. For example, two resistors R43 and R45 are connected in parallel, each being in series with a switch K43, respectively K45. Switches K43 and K45 (for example, MOS transistors) are intended to be switched to implement the method for determining the coupling position. Processing unit 27 (PU) receives information about voltage $V_{Ca}$ on an input MES to implement the above-described method. In the example of FIG. 5, when the two resistors R43 and R45 are functionally connected, resistor R2 (load of the transponder circuits) has value R20. The disconnection of one of the resistors (for example, resistor R43) increases resistance R2 towards value R21. Other connections and switchings may be provided according to the embodiment of the implemented method. For example, a single switchable resistor may be used, considering that one of the two values of resistor R2 corresponds to the resistive load of the other transponder circuits.

According to a preferred embodiment, the switchable resistor corresponds to that used for a resistive retromodulation. For example, a first measurement is performed by switching the retromodulation resistor so that it is functionally in the circuit (switch K30 in the on state in the example of FIG. 2). Voltage $V_{C2]R20}$ is measured. Then, switch K30 is turned off and voltage $V_{C2]R21}$ is measured.

As a variation, the increase or the decrease of equivalent resistance R2 is caused by a variation of the power consumption of the transponder circuits, typically of processing unit 27. For example, to decrease the value of resistor R2 (to increase the power consumption), the execution of calculations or of processings by unit 27 is triggered. An increase of equivalent resistance R2 may also be caused by decreasing the power consumption of unit 27 by interrupting certain calculations. As a variation, the execution speed conditioned by the clock is slowed down (block 20). The variation of resistance R2 is known from the time when the power consumption of different tasks to be executed by unit 27 is known.

The calculations required to authenticate a terminal are sufficiently simple for their execution time to be negligible with respect to the displacement speed of a transponder in front of a terminal (and thus the variation speed of the coupling coefficient). Such is in particular the case for transponders equipped with microcontrollers executing cryptography functions in which such calculation-intensive functions are themselves executed in a duration for which it can be considered that the coupling does not vary. In other cases, the transponder remains laid on a reception surface of the terminal and the coupling thus does not vary for an even longer period.

It should be noted that the authentication is performed without requiring to establish a communication with the terminal. Accordingly, a protection of the data contained in the transponder is guaranteed since a demodulation of a request (and thus an opening of the communication functions of the transponder) can only be authorized once the terminal has been authenticated.

Figure 6:
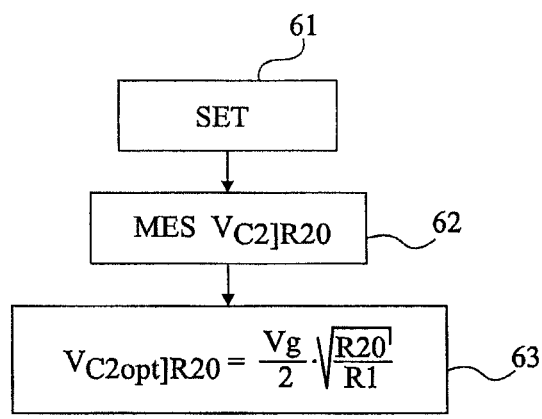
FIG. 6 is a block diagram of an embodiment of a transponder capable of authenticating a terminal.

FIG. 6 is a functional block diagram of an example of a training phase.

Such a phase is implemented when a terminal is desired to be matched with a transponder or a family of transponders. For example, such a phase is implemented in a transponder calibration phase at the end of the manufacturing. According to another example, the values are determined based on samples and are recorded in non-volatile memories of the transponders in a series manufacturing. According to still another example, the matching of a transponder and of a terminal is accessible by a final user to only authorize exchanges between electromagnetic devices that it selects (for example his cell phone with his laptop computer). For values Vg and R1 to be available for the transponder, it may be provided for these values to be communicated thereto by the actual terminal in this training phase.

It is started by setting (block 61, SET) the transponder in a relation of nominal coupling with the terminal. For example, such a relation comprises laying a chip card or another type of transponder on a terminal with which it is desired to be matched.

Then (block 62, MES $V_{C2]R20}$), voltage $V_{C2]R20}$ is measured with a given resistive load of the transponder.

Finally, this voltage, value R20 of the corresponding resistor, and values R1 and Vg corresponding to the terminal are stored. These values may be provided by the manufacturer of the terminal or be measured by adapted detection elements of the terminal and communicated to the transponder, for example, by initiating a specific communication during the training phase. Rather than storing the different values, the transponder may $$\left(\text{block 63, } V_{C2opt]R20} = \frac{Vg}{2} \cdot \sqrt{\frac{R20}{R1}}\right)$$

directly calculate value $V_{C2opt]R20}$ by applying formula 10 and store the result.

Various embodiments with different variations have been described hereabove. It should be noted that those skilled in the art can combine various elements of these various embodiments and variations without showing any inventive step. In particular, the selection and the order of the tests to be performed depend on the application, for example, on the time available to perform the authentication, on the calculating capacity of the transponder, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:
1. An electromagnetic transponder comprising:
    an oscillator configured to provide a signal in response to an electromagnetic field of a terminal; and
    a processor configured to use the signal provided by the oscillator and variation of a load resistance on the oscillator to determine an authenticity of the terminal without demodulating the signal provided by the oscillator.

2. The electromagnetic transponder of claim 1, wherein:
determining the authenticity of the terminal comprises determining that the terminal is authentic, and
the processor is further configured to establish communication with the terminal in response to determining that the terminal is authentic.

3. The electromagnetic transponder of claim 1, wherein determining the authenticity of the terminal comprises determining the authenticity of the terminal without using modulation to transmit data to the terminal.

4. The electromagnetic transponder of claim 1, wherein determining the authenticity of the terminal comprises determining the authenticity of the terminal without using information obtained by decrypting the signal.

5. The electromagnetic transponder of claim 4, wherein determining the authenticity of the terminal comprises determining the authenticity of the terminal without using information obtained by decrypting any signal transmitted by the terminal.

6. The electromagnetic transponder of claim 1, wherein determining the authenticity of the terminal comprises determining the authenticity of the terminal without using information obtained by demodulating any signal transmitted by the terminal.

7. The electromagnetic transponder of claim 1, wherein determining the authenticity of the terminal comprises determining the authenticity of the terminal without demodulating any signal transmitted by the terminal.

8. The electromagnetic transponder of claim 2, wherein the electromagnetic transponder includes one or more circuits configured to form a resistive load on the oscillator, and wherein establishing communication with the terminal comprises using the resistive load to perform retromodulation.

9. The electromagnetic transponder of claim 1, wherein:
using the signal provided by the oscillator to determine the authenticity of the terminal comprises comparing a quantity to a reference value, the quantity depending on the signal and on a coupling between the transponder and the terminal.

10. The electromagnetic transponder of claim 9, wherein the quantity depends on a voltage of the signal.

11. The electromagnetic transponder of claim 9, wherein the signal provided by the oscillator is a first signal, wherein the oscillator is further configured to provide a second signal in response to the electromagnetic field of the terminal when a specified coupling exists between the transponder and the terminal, and wherein the reference value depends on a voltage of the second signal.

12. A method comprising:
providing a signal of an oscillator in response to an electromagnetic field of a terminal; and
using the signal provided by the oscillator and variation of a load resistance on the oscillator to determine an authenticity of the terminal without demodulating the signal provided by the oscillator.

13. The method of claim 12, wherein:
determining the authenticity of the terminal comprises determining that the terminal is authentic, and
the method further comprises establishing communication with the terminal in response to determining that the terminal is authentic.

14. The method of claim 12, wherein determining the authenticity of the terminal comprises determining the authenticity of the terminal without using modulation to transmit data to the terminal.

15. The method of claim 12, wherein determining the authenticity of the terminal comprises determining the authenticity of the terminal without using information obtained by decrypting the signal.

16. The method of claim 12, wherein:
using the signal to determine the authenticity of the terminal comprises comparing a quantity to a reference value, the quantity depending on the signal and on a coupling between a transponder and the terminal.

17. The method of claim 16, wherein the quantity depends on a voltage of the signal.

18. The method of claim 16, wherein the signal is a first signal, wherein the method further comprises providing a second signal in response to the electromagnetic field of the terminal when a specified coupling exists between the transponder and the terminal, and wherein the reference value depends on a voltage of the second signal.

19. An electromagnetic transponder comprising:
an oscillator configured to provide a signal in response to an electromagnetic field of a terminal; and
means for using the signal provided by the oscillator and variation of a load resistance on the oscillator to determine an authenticity of the terminal without demodulating the signal provided by the oscillator.

20. A system comprising:
a terminal including a first oscillator configured to generate an electromagnetic field; and
a transponder including:
a second oscillator configured to provide a signal in response to the electromagnetic field, and
a processor configured to use the signal provided by the second oscillator and variation of a load resistance on the second oscillator to determine an authenticity of the terminal without demodulating the signal provided by the second oscillator.

21. The electromagnetic transponder of claim 1, wherein determining the authenticity of the terminal comprises determining the authenticity of the terminal without decrypting any signal transmitted by the terminal.

22. The electromagnetic transponder of claim 1, wherein determining the authenticity of the terminal comprises determining the authenticity of the terminal independent of decrypting any signal transmitted by the terminal.

23. The electromagnetic transponder of claim 3, wherein determining the authenticity of the terminal comprises determining the authenticity of the terminal without transmitting data to the terminal.

24. The method of claim 15, wherein determining the authenticity of the terminal comprises determining the authenticity of the terminal without using information obtained by decrypting any signal transmitted by the terminal.

25. The method of claim 12, wherein determining the authenticity of the terminal comprises determining the authenticity of the terminal without using information obtained by demodulating any signal transmitted by the terminal.

26. The method of claim 12, wherein determining the authenticity of the terminal comprises determining the authenticity of the terminal without demodulating any signal transmitted by the terminal.

27. The method of claim 12, wherein determining the authenticity of the terminal comprises determining the authenticity of the terminal without decrypting any signal transmitted by the terminal.

28. The method of claim 12, wherein determining the authenticity of the terminal comprises determining the authenticity of the terminal independent of decrypting any signal transmitted by the terminal.

29. The method of claim 12, wherein determining the authenticity of the terminal comprises determining the authenticity of the terminal without transmitting data to the terminal.

30. An electromagnetic transponder comprising:
- an oscillator configured to provide a signal in response to an electromagnetic field of a terminal; and
- a processor configured to use the signal provided by the oscillator and variation of a load resistance on the oscillator to determine an authenticity of the terminal without using modulation to transmit data to the terminal.

31. The electromagnetic transponder of claim 30, wherein determining the authenticity of the terminal comprises determining the authenticity of the terminal without transmitting data to the terminal.

32. The electromagnetic transponder of claim 30, wherein determining the authenticity of the terminal comprises determining the authenticity of the terminal without demodulating the signal.

33. The electromagnetic transponder of claim 30, wherein determining the authenticity of the terminal comprises determining the authenticity of the terminal without using information obtained by demodulating any signal transmitted by the terminal.

34. The electromagnetic transponder of claim 30, wherein determining the authenticity of the terminal comprises determining the authenticity of the terminal without demodulating any signal transmitted by the terminal.

* * * * *